July 9, 1968

M. J. LLOYD 3,391,481

STRUCTURE FOR SIGNS, DECORATIVE PANELS AND THE LIKE
AND PREFORMED INTERFITTING ELEMENTS
FOR FORMING THE STRUCTURE

Filed Jan. 29, 1965

INVENTOR.
MILTON J. LLOYD

BY
Paul A. Weilein
ATTORNEY

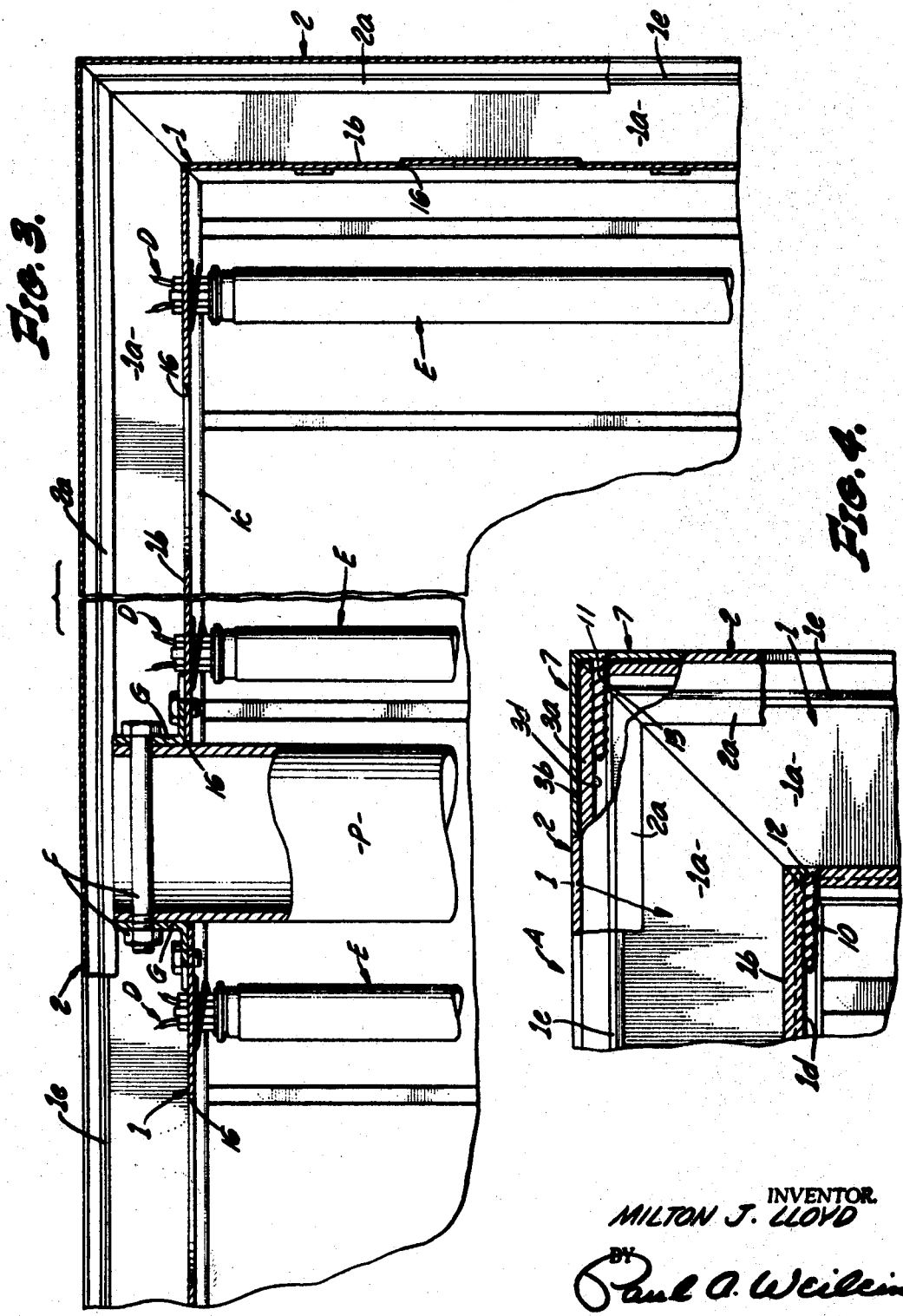

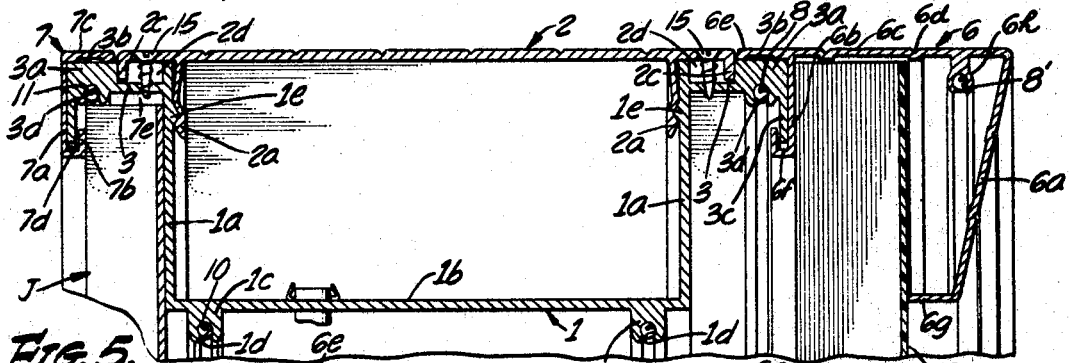

United States Patent Office 3,391,481
Patented July 9, 1968

3,391,481
STRUCTURE FOR SIGNS, DECORATIVE PANELS AND THE LIKE AND PREFORMED INTERFITTING ELEMENTS FOR FORMING THE STRUCTURE
Milton J. Lloyd, San Marino, Calif., assignor to W. Heath & Company, Inc., Los Angeles, Calif., a corporation of California
Filed Jan. 29, 1965, Ser. No. 429,095
14 Claims. (Cl. 40—130)

ABSTRACT OF THE DISCLOSURE

A sign of modular construction has a main rectangular frame formed of channel members with their open sides outwardly of the frame. The two opposite side walls of the channel members have laterally extending longitudinal flanges shaped for interlocking engagement with additional rectangular frame members which cooperate with the main frame to captivate panels that form the opposite faces of the sign.

---

This invention relates to the construction of signs, decorative panels, and the like, and resides in the provision of an improved sign, panel, or frame structure and novel components thereof which make it possible quickly, easily, and economically to produce a sign, panel, or the like.

An object of this invention is to provide novel elongate extrusions of light, strong material, such as aluminum, and which have formations such that sections cut therefrom of desired length readily may be interfitted to form a sign, panel, frame, or similar structure of desired size and form.

It is another object to provide extrusion elements such as next above noted which may be preformed of various widths, lengths, and cross-sectional form to make it possible to produce structures such as above described with a minimum of extraneous fastening elements, due to the manner in which the extrusion elements or portions thereof will interfit and interlock upon assembly thereof.

Another object hereof is to provide elongate extrusion elements which include a base element of novel form that generally determines the space available interiorly of the structure to be formed, suitable for housing illuminating means or other apparatus. These base elements, in cooperation with other of the extrusion elements, will form hollow or tubular frame members or beams that will constitute the main part or body of the structure. In being tubular or hollow, the base elements may be employed to enclose and protect electrical wiring and equipment that may be employed to illuminate a sign embodied in the structure.

Further, it is an object to provide tubular or hollow base elements such as next above described, each of which is advantageously formed as an elongate extruded channel member and an elongate closure plate overlying and closing the open side of the channel member. Extensions in the form of flanges project laterally outwardly from the outer faces of the side walls of the channel members adjacent the open side of the channel members and extend the length thereof. These flanges have formations which will provide for the interfitting with the flanges in inter locked connection therewith of other of the extruded elements for completing the structure or for forming an auxiliary frame projecting laterally outwardly on one or both sides of the body of the structure and in which may be mounted panels for signs or for decorative or other purposes. Moreover, such an auxiliary frame may be used for trimming the main frame and in all instances will overlie the flanges and formations thereon and may be disposed so as to be flush with the closure plates that overlie the open sides of the channel members to form neat and tight joints.

Another object of this invention is to provide a structure for a sign, panel, and the like wherein the extruded elements that are assembled in interfitted and interlocked relation to one another to form the desired structure, will provide drain channels interiorly thereof adjacent critical exposed joints where rain water may leak into the structure.

Another object is to provide a structure such as described wherein the base or main tubular members forming the main body of the structure may be provided with openings that will permit posts or the like to extend into the structure as supports therefor and which also constitute service openings which, upon removal of the closure plates, will afford ready access to the interior of the structure for disposing therein electrical wires and electrical lighting equipment as well as for servicing or renewal of such equipment.

It is an important object of this invention to provide exruded channel members and associated extrusion elements for attachment to the channel members whereby a novel illuminated display sign may be produced easily and economically. Such a sign, for example, will consist of four of the channel members secured end-to-end to provide a main frame consisting of top and bottom channel members and end channel members all disposed with their open sides facing outwardly. The associated extrusion elements that form auxiliary frames are interlocked with the front and rear sides of this main frame and project outwardly the desired extent. This outward extension of the main frame by auxiliary frames depends upon the sizes of the attached extrusion elements which also make it possible to hold in place panels for closing the front and rear of the frame. One or both of these panels may be used as a sign and may be translucent in order to provide an illuminated background for sign elements. The channel members are preferably of such width that the space within the channel extending about the frame will accommodate lighting equipment such as wiring junction boxes, ballasts, and the like, while within the space between the top, bottom, and ends, elongate lighting tubes may extend between web portions of the upper and lower channel members. In having the channels arranged with the open sides facing outwardly, access to the space interiorly of the frame as well as to the interior of the channels is facilitated and openings are provided in the webs of these channels for reception of posts for supporting the sign and for use as servicing openings for the lighting and other equipment disposed within the frame. After the sign has been completed as to installation of lighting or other equipment interiorly thereof, the open sides of the channel are closed by other extrusion elements in the form of plates that interlock with the channel members when positioned thereon.

In accordance with another object, the plates and the channel frame member cooperate to effectively preclude entry of water into the sign, without requiring special sealing elements ordinarily required in the case of electrical sign or display dvices which are exposed to the weather.

Other objects and advantages of the invention will be hereinafter described or will become apparent to those skilled in the art, and the novel features of the invention will be defined in the appended claims.

Referring to the drawings:

FIG. 3 is a fragmentary sectional view taken substantially on the line 3—3 of FIG. 1, on an enlarged scale;

FIG. 4 is a fragmentary sectional view taken on the line 4—4 of FIG. 2;

Figure 1:
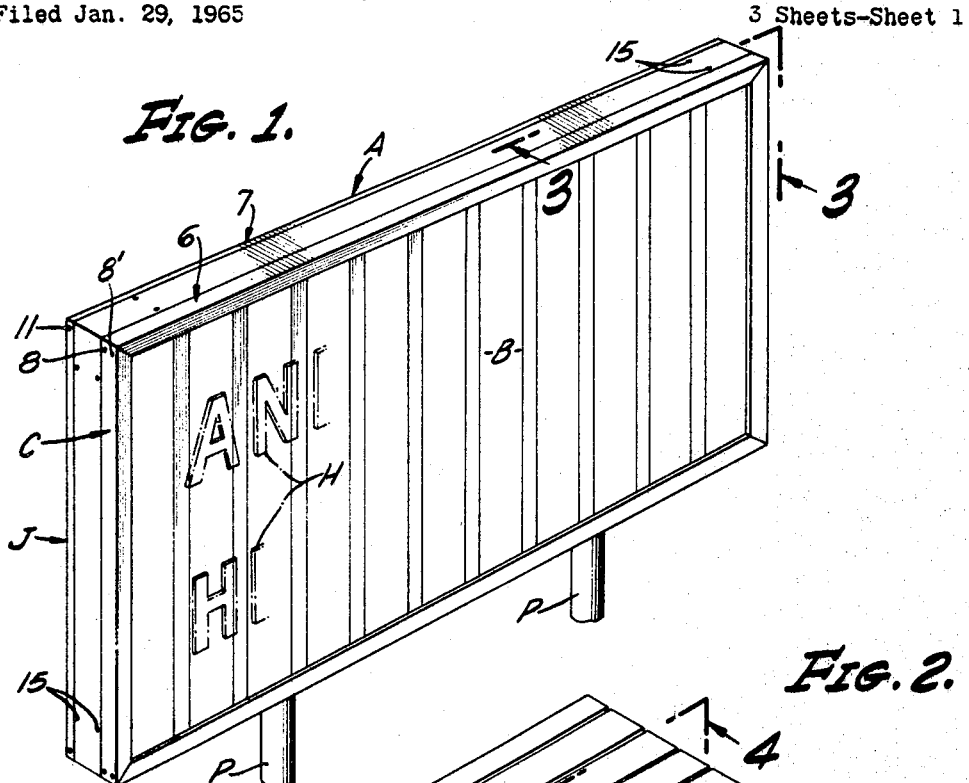
FIG. 1 is a perspective view of a display sign structure made in accordance with the invention.
Figure 2:
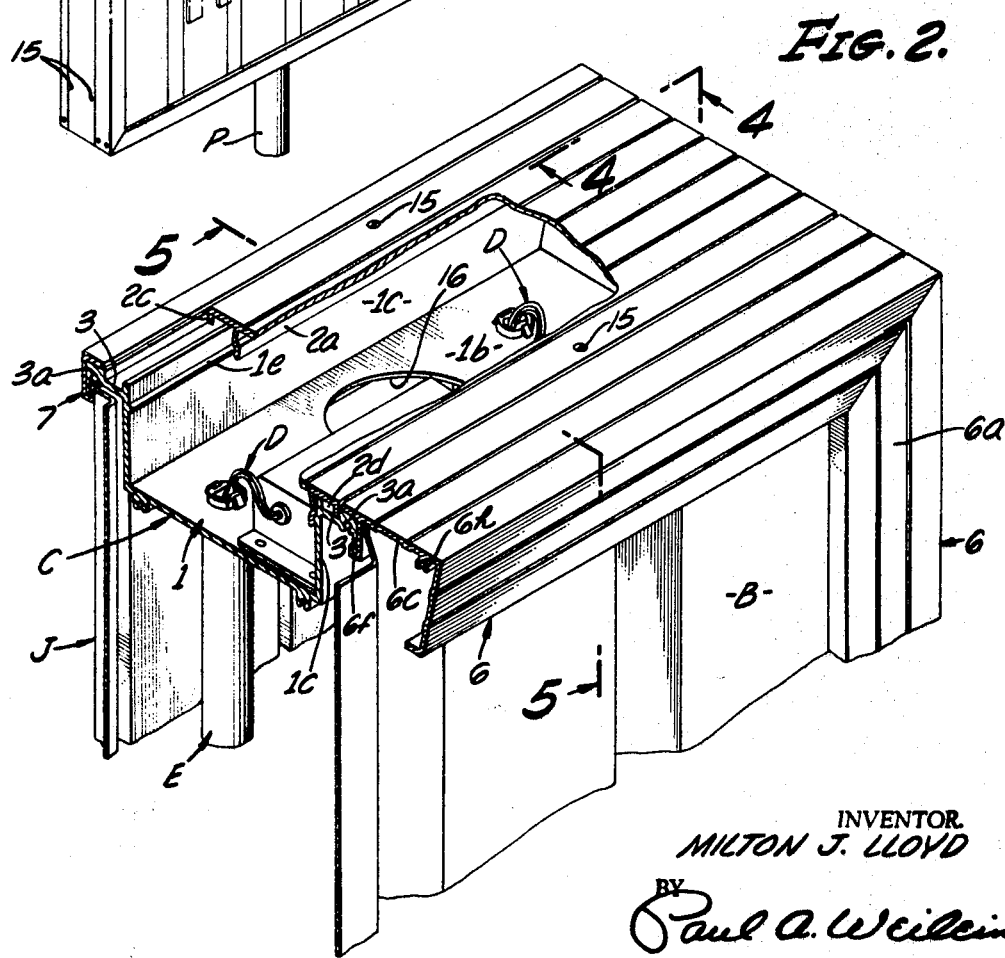
FIG. 2 is an enlarged fragmentary perspective view partly in section of a portion of the sign structure shown in FIG. 1.

FIG. 5 is a fragmentary sectional view taken on the line 5—5 of FIG. 2 and is typical of any sectional view taken across the top, bottom, and side portions of the sign structure shown in FIGS. 1 and 2, excepting the showing of the sign panel; and FIGS. 6, 7, 8 and 9 are typical fragmentary sectional views similar to FIG. 5 showing respectively different modified forms of the sign structure that can be made with preformed structural elements embodying the present invention.

As shown in the accompanying drawings, a structure and the component elements thereof embodying the present invention, by way of example, form a rectangular and hollow display sign A having a sign panel B and a main frame C, there being electrical wiring D and electrical lighting equipment E within the sign, also supporting posts P for the sign that extend upwardly into the structure and are secured by fastenings F to anchoring fittings G fixed to the structure as shown in FIG. 3. The panel B may be translucent with sign characters H thereon or may be opaque with any suitable sign characters thereon. On the other side of the main frame structure C is a closure plate or wall J, it being noted that as will be hereinafter described, the main frame structure C may be formed for sign panels on both sides, if this is desired.

The main frame structure C is formed of extrusions of suitable rigid material such as aluminum that are elongate and of such shapes, widths, and cross-sectional and other formations, that cut lengths thereof to form a frame of given size, will interfit and interlock when assembled in connected relationship. The formation of these extrusions is such that a minimum of separate fastening elements will be required and a frame of any desired size may be quickly, easily, and economically formed by interfitting and interlocking the extrusions.

As here shown, the extruded elements for forming a frame structure in accordance with this invention are shaped to form a rectangular frame but obviously may be of different shapes provided they include tubular or hollow members each of which is formed of a channel member 1 and a closure member or plate 2 overlying and closing the open side of the channel member 1. The members 1 and 2 are cut to required length from elongate extrusions having the formations hereinafter more specifically described.

Each channel member 1 is provided with extensions or flanges 3 that project laterally outwardly from the outer faces of the side walls 1a adjacent the open side thereof. The flanges 3 facilitate the attachment to the channel members of additional extruded frame elements that make up auxiliary frames for mounting on either or both sides of the main frame.

Also provided on each channel member 1 on the exterior of the base wall or web 1b thereof are longitudinally grooved ribs 1c extending the full length of the channel member adjacent the junctures of the side walls 1a with the web 1b. These grooved ribs reinforce the channel member, and the grooves 1d are more than half-round in cross-section and are adapted to receive fastening elements as will be hereinafter described.

Extending along the inner faces of the side walls 1a near the open side of each channel member are ribs 1e which are adapted to cooperate with elongate and headed snap fastener projections 2a extending along each closure plate 2 whereby, upon placing the plates over open sides of the channel members, they will become detachably fastened in place as shown in FIG. 5.

Each of the extensions or flanges 3 at its outer end is provided with an enlarged rib-like portion 3a of rectangular cross-section having an outer surface 3b substantially coplanar with the free edges of the side walls 1a. Each enlarged rib portion 3a has a flange 3c extending inwardly therefrom and parallel with the adjacent side wall 1a.

The surface of each rib portion 3a opposite the outer surface 3b is formed with a groove 3d extending longitudinally thereof and having the same cross-sectional form as the grooves 1d.

Before placing the closure plates 2 on the channel member 1, other extruded elements may be attached to the flanges 3 to form auxiliary frame extensions on one or both sides of the main frame. As an example, FIG. 5 illustrates typical attachments connected to the flanges 3. In providing a frame for a sign as shown in FIGS. 1-5, where the sign elements are on but one side of the main frame composed of channel members 1, the flanges 3 on the sign side, as seen in FIGS. 2 and 5, have four auxiliary frame members secured thereto. Each such auxiliary comprises an elongate extrusion member 6 of channel shape in cross-section having a long outer side wall 6a, a short inner side wall 6b, and a relatively wide web 6c. Portions of each member 6 may be provided with small longitudinal reinforcing ribs 6d and the base wall 6c has a flange-like extension 6e projecting beyond the joint of the short side wall 6b with the base wall or web 6c. The extension 6e rests on the surface 3b of the rib 3a of flange 3. The short side wall 6b of each member 6 at its free end is bent outwardly and then inwardly parallel with the outer face of the wall 6b to form a channel portion 6f along the wall 6 facing toward the flange 6e.

Each of the four auxiliary frame members 6 may be assembled on each of the channel members 1 before the latter are joined together, by sliding each member 6 onto the flange 3 so that the flange portion 6e slides along the outer face 3b of the rib 3a while the flange 3c slides in the channel portion 6f and against the outer face of the short wall 6b. The auxiliary frame members 6 have bevelled ends corresponding to the bevelled ends of the channel members 1, and the auxiliary frame members 6 may be fitted as above noted onto each channel member 1 so that the bevelled ends are aligned. The interfitting of the auxiliary frame members 6 with the flanges 3 causes a reliable interlocking connection of these members.

The side of the main frame structure C opposite the side to which the auxiliary frame members 6 are attached, may be finished with elongated auxiliary frame member in the form of extruded trim members 7 having bevelled ends and being channel shaped in cross-section. Each auxiliary frame member 7 has a base wall or web 7a, a short side wall 7b, a long side wall 7c, and a channeled formation 7d along the outer edge of the short side wall. The auxiliary frame members 7 may be mounted on the corresponding channel members 1, as shown in FIG. 5, so as to interlock with the flanges 3 in a manner similar to the interlocking of the auxiliary frame members 6. The inwardly directed flanges 3c of the flanges 3 and the channel formations 7d form with the adjacent side walls 1a of the channel members 1 in the finished sign structure, as shown in FIG. 5, an inwardly-facing channel 7e in which the panel or closure wall J may be fitted to close the back of the hollow sign structure.

Fastenings 8 and 11 of the self-tapping type may be applied as shown in FIG. 1 to secure the auxiliary frame members 6 and 7 in place on opposite sides of the main frame structure formed by the channel members 1 and closure plates 2. Suitable holes, not shown, are drilled in the auxiliary frame members 6 and 7 and flanges 3 to accommodate these fastenings. The auxiliary frame members 6 have grooved ribs 6h corresponding to the grooved ribs 1c and which receive in the grooves thereof the fastenings 8' for securing the auxiliary frame members 6 together at the ends thereof, as shown in FIGS. 1 and 5.

With each of the four channel members 1 of the main frame having the extruded auxiliary frame elements 6 and 7 fixed thereto, these channel members may now be joined in end-to-end relation with the bevelled ends of the channel members abutting one another and with the bevelled ends of the frame members 6 and 7 abutting one another and with each channel member 1 having its open side facing outwardly.

The fastening of the channel members 1 of the main frame and the auxiliary frame members 6 and 7 at the abutting ends thereof may be effected as shown in FIG. 4 by use of self-tapping fastenings 10 and 11, the fastenings 10 being inserted through openings 12 formed in the base walls 1b of the end channel members 1 which extend vertically in the frame structure and thence into the grooves 1d formed in the ribs 1c of the top and bottom channel members 1. Similarly, the fastenings 11 are inserted through openings 13 in the auxiliary frame members 7 on the end members 1 of the frame structure and into the groove 3d of the flange 3 in the top and bottom channel members 1 of the main frame. The sign structure may now be completed by applying the closure plates 2 for closing the open sides of the channel members 1. As hereinbefore noted, when these closure plates are applied, the snap fastener projections 2a thereon will cooperate with the ribs 1e on the members 1 to detachably hold the members 2 in place. Additional fastenings 15 of the self-tapping type may be applied through the closure plates 2 to secure them in place. It should be noted that when the closure plates 2 are fitted onto the members 1, flanges 2c on the longitudinal edges of the plates abut the ribs 3a and form with the flange 3 and portions of the side walls 1a, drain channels 2d which extend completely around the frame. The extended edge portions of the closure plates 2 on the lower side of the frame structure may have small openings therein, not shown, to discharge any moisture or water collecting in the drain channels 2d. Moreover, the outer surfaces of the plates 2 and members 6 and 7 are flush and provide tight and neat joints on the flanges 3 of the channel members 1.

It should be noted that the channel members 1 of the main frame are provided with openings 16 in the webs or base walls 1b, for accommodating the posts P as well as for affording access to the wires and electrical lighting equipment. Access to these openings may be had by removing the closure plates 2.

The extruded auxiliary frame members 6 form an auxiliary frame for the sign panel B. This panel, upon removal of auxiliary frame member 6 at one end of the sign structure, may be positioned properly by sliding it in place, after which the removed auxiliary frame member is restored to enclose the panel.

The long side walls 6a of an auxiliary frame member 6 may, as here shown, be inclcined inwardly to enhance the appearance of the sign structure. These side walls may also be formed with inwardly directed flanges 6g for contact with the sign panel B and to further improve the appearance of the sign as well as to aid in holding the panel B in place.

FIG. 6 illustrates a modified form of structure embodying this invention and which provides for displaying signs on both sides of the structure. This is provided for by having auxiliary frame members 6 affixed on both sides of the structure. As the construction of the parts shown in FIG. 6 is the same as shown in FIG. 5 except for the auxiliary frame members 7 that are omitted in FIG. 6, the same reference characters are employed. However, the two sign panels as shown in dotted lines are designated B1 and B2.

FIG. 7 illustrates another modified structure wherein an extruded auxiliary frame member of channel form designated 19 is interposed between each channel member 1 of the main frame structure and each auxiliary frame member 6 for the purpose of extending the width of the sign. A sign panel shown in dotted lines is designated B3 and all of the other parts being of the same construction as shown in FIG. 5 are identified by the same reference characters. The auxiliary frame member 19 is provided with side walls 19a which abut the flanges 3c of the flanges 3 and the flange 6b of the auxiliary frame member 6. One of the side walls 19a is provided with a channel formation 19c to embrace the flange member 3c. The other side wall 19a is fitted into the channel formation 6f of the auxiliary frame member 6. With this arrangement the lateral extension of one side of the frame structure of the sign is increased, and this, in some instances, may be desired.

FIG. 8 illustrates a further embodiment of this invention wherein an auxiliary frame member 20 corresponding generally to one of the auxiliary frame members 6 shown in FIG. 5, is attached to each of the main frame channels 1 and is channel shaped so that it will hold in place a relatively thin sign panel 21. For this purpose, the auxiliary frame member 20 is provided on one side wall 20a with an outwardly directed flange 20b to engage the inner side of the relatively thin panel 21. The other side wall 20c of the auxiliary frame member 20 has an inwardly directed flange 20d engaging the outer side of the panel 21. All other elements in this form are the same as shown in FIG. 2 and bear the same reference characters.

An additional modification of this invention shown in FIG. 9 provides an auxiliary frame member 22 somewhat similar to each auxiliary frame member 6 shown in FIG. 5 and which is fastened to each channel member 1 of main frame in the same manner as shown in FIG. 5. Each auxiliary frame member 22 is of the same construction as shown in FIG. 5, except that it has an intermediate wall 22a between the long side wall 22b and the short side wall 22c. This intermediate wall 22a has a flange 22d which engages one side of a thin panel member 23, while a flange 22e on the wall 22b engages the other side of this thin channel member. Another difference in construction in auxiliary frame member 22 compared to each auxiliary frame member 6 shown in FIG. 5 is that the web or wall 22f of auxiliary frame member 22 is relatively wide, thereby increasing the thickness of the sign structure, such as may be desired in some instances. Those of the parts shown in FIG. 9 which are the same as shown in FIG. 5 are identified by the same reference characters.

It will now be apparent that the extruded elements provided in accordance with this invention readily and easily may be interfitted, interlocked and secured together to form various types of economical structures suitable for signs or the other purposes herein described.

One of the important extruded elements which makes it possible to form the structures for the purposes herein described is the base or main extruded channel element. These channel elements will form the base frame of the different structures that may be produced in combination with the different forms of attachment elements here provided. The flanges 3 having the ribs 3a and other portions thereon arranged at lateral extensions of the side walls of the channel members 1, make it possible quickly and easily to attach to the channel members the other extruded elements here provided in various sizes and shapes to produce economically structures of different sizes and forms for the purposes herein described.

With reference to the foregoing description and accompanying drawings, it will be apparent that illuminated signs or display structures readily and economically may be produced in accordance with this invention by the use of channel members for forming the main frame, the auxiliary frame members for application to opposite sides of the main frame and the closure plates for closing the channel members when assembled as hereinbefore described. This sign structure readily lends itself to elective illumination by the provision of lighting tubes which may be extended between web portions of the channels and also makes it possible readily to install and service lighting or other equipment contained within the sign. A further advantage is the provision for closing opposite sides of the sign with panels, one or both of which may be employed as a sign and may be translucent.

With further reference to the foregoing description it is apparent that the sign structure is of a modular construction in which a main frame of polygonal configuration is augmented in width by auxiliary frames, the auxiliary frames being mounted on the opposite sides of the main frame. An important feature of the invention is that each of the auxiliary frames is retained on the main frame by interlocking engagement with the main frame. For this purpose, the auxiliary frame is made of frame members that are paired with the frame members of the main frame and the two frame members of each of the pairs of frame members have integral longitudinal portions in mutual interlocking engagement.

To interlock the auxiliary frame member with a main frame member, the auxiliary frame member is first placed at an abnormal position relative to the main frame member, i.e., a position relative to a main frame member that differs from the position of the auxiliary frame member relative to the main frame member in the finished sign structure. Thus, the procedure for interlocking an auxiliary frame member with a main frame member may consist of, first, positioning the auxiliary frame member alongside the main frame member with the auxiliary frame member canted or laterally tilted on its longitudinal axis, second, moving the canted auxiliary frame member bodily laterally into engagement with the main frame member, and third, turning the auxiliary frame member about its longitudinal axis to its normal position relative to the main frame member. Thereafter, one or more suitable self-tapping fastenings may be applied to keep the auxiliary frame member in its normal position relative to the corresponding main frame member thereby to keep the two frame members effectively interlocked. Thus, the self-tapping fastening designated 8 in FIG. 1 engages a grooved rib 3a (FIGS. 2 and 5) of the main frame to keep the upper horizontal auxiliary frame member 6 interlocked with the main frame member by keeping the auxiliary frame member from canting or tilting out of its interlocked position. In the same manner, the fastening designated 11 in FIG. 1 engages a similar grooved rib 3a of the main frame to maintain the upper auxiliary frame member 7 in its normal interlocked position. It is to be noted also that since the mutually abutting ends of the auxiliary frame members are bevelled, the auxiliary frame members of the finished auxiliary frame cooperate with each other to prevent longitudinal sliding movements of the auxiliary frame members relative to the main frame.

It is further apparent that an auxiliary frame member may, if desired, be interlocked with a corresponding main frame member, by longitudinal sliding movement relative to the main frame member instead of lateral relative movement. Thus, the preliminary abnormal position of an auxiliary frame member for carrying out the interlocking operation may be a position of end-to-end relationship with the main frame member with the auxiliary frame member offset somewhat out of longitudinal alignment with the frame member. From this abnormal preliminary position the auxiliary frame member is in effect telescoped into a portion of the corresponding main frame member and then slid longitudinally along the main frame member until the auxiliary frame member reaches its normal position.

It is apparent that it is a simple matter to replace a panel of the sign structure. Thus, the sign panel B may be removed by simply removing the fasteners 8 and 8' at one end of the auxiliary frame 6 to remove one of the vertical auxiliary frame member 6, thereby to permit the panel B to slide longitudinally out of engagement with the auxiliary frame 6. In the same manner, fasteners 11 at one end of the sign structure may be removed for removal of a vertical auxiliary frame member 7 to permit the rear closure plate or wall J to be slid longitudinally out of the sign structure.

With further reference to the foregoing description, it is apparent that a feature of the invention is the concept of employing extruded stock to make a modular sign structure. For this purpose it is essential that the channel-shaped extrusions of the main frame and the extrusions of an auxiliary frame be complementary to each other in the sense that they have integral longitudinally extending portions shaped and dimensioned for mutual interlocking engagement. Thus, the fabrication of a modular sign is simplified because the channel shaped extrusions may be cut to length to form a main frame for a sign and the complementary extrusions may be cut to length and then individually interlocked with the channel-shaped extrusions to form an auxiliary frame that is effectively united with the main frame.

While specific structural details have been shown and described, it should be understood that changes and alterations may be resorted to without departing from the spirit of the invention as defined in the appended claims.

I claim:

1. A structure for a sign, decorative panel, and the like, including: elongate tubular and rigid members joined to form a frame; each of said members being formed of an elongate rigid channel member and an elongate rigid plate closing the open side of the channel member; a flange on each side wall of each channel member projecting laterally outwardly therealong, said elongate channel member being provided with elongate drain channels extending along each of said flanges, said plate being provided with elongate marginal edge flanges disposed in said drain channels; and formations on said flanges affording the attachment to said tubular members of elongate elements in overlying relation to said flanges and formations to complete the frame.

2. A sign structure, comprising: elongate channel members joined end-to-end to form a frame having top and bottom channel members and end channel members; said channel members being connected with their open sides facing outwardly; elongate attachment members secured to the front and rear of and projecting outwardly from said frame; a pair of panel members; means embodied in said attachment members for forming a pair of frames around and supporting the respective panel members; at least one of said panel members being translucent; said top and bottom channel members having electrical receptacles carried thereby at the base of said channel members and in opposed axially spaced relation; illuminable tubes interposed between said receptacles; electric leads connected to each of said receptacles and disposed in said channels; and elongate closure plates mounted on and closing the open sides of said channel members.

3. A structure for a sign, decorative panel, and the like, including: elongate rigid members joined to form a frame; each of said members being formed of an elongate rigid channel member with the open side of the channel member facing outwardly of the frame and an elongate rigid plate closing the open side of the channel member; a flange on each side wall of each channel member projecting laterally outwardly therealong adjacent the open side thereof; elongate auxiliary frame members corresponding in length to said channel members; and formations on said auxiliary frame members and said flanges cooperable for interlocking said flanges and said auxiliary frame members with the latter disposed in positions laterally outwardly spaced from said side walls.

4. The structure as set forth in claim 3, wherein said auxiliary frame members on one side of said frame provide an inwardly facing channel formation extending around said frame for reception of a panel element to close said side of the frame.

5. A structure for a sign, panel, and the like, including: elongate rigid members joined at their ends to form a frame; each of said rigid members having opposed side walls; flanges projecting laterally outwardly from the outer face of one of said side walls; each of said flanges having an inwardly extending portion along the outer extremity thereof; elongate auxiliary frame members for extending one side of the frame laterally iutwardly; said auxiliary frame members having side walls provided with channel formations along margins thereof for receiving said inwardly extending portions of said flanges; and said auxiliary frame members having marginal portions disposed to overlie said flanges when said inwardly extending portions of said flanges are disposed in said channel formations to interlock said auxiliary frame members to said flanges.

6. The structure as set forth in claim 5, wherein said auxiliary frame members are of channel shape in cross section with the open sides facing inwardly and the side walls thereof disposed to receive therebetween the marginal portions of a panel.

7. A structure for a sign, decorative panel, and the like, including: elongate channel members respectively having a base wall and parallel side walls; at least a pair of ribs extending the full length of each of said channel members and each of said ribs having an open groove extending the full length of said rib; means interconnecting said channel members at their ends to form a frame having top, bottom and end channel members, the respective channel members abutting on complemental angles; and the means interconnecting said channel members including fastener elements extending through the base wall of certain of said channel members into said groove in said ribs of the abutting channel member.

8. A modular sign structure of the configuration of a polygon, having in combination: a main frame; and an auxiliary frame mounted on one side of the main frame to augment the thickness thereof, said main frame, comprising main frame members corresponding to the sides of the polygon and interconnected at their ends, said auxiliary frame comprising auxiliary frame members corresponding to the sides of the polygon, said auxiliary frome members being paired with the main frame members, the two frame members of each of the pairs of frame members having integral portions in mutual interlocking engagement whereby the auxiliary frame members may be first placed in abnormal positions relative to the corresponding main frame members for initial engagement therewith and then may be moved relative to the main frame members into their normal positions in interlocking engagement therewith to secure the auxliary frame to the main frame.

9. A combination as set forth in claim 8 in which the ends of the auxiliary frame members abut in the assembled auxiliary frame whereby the auxiliary frame members block longitudinal movement of each other and the auxiliary frame is captivated by the main frame.

10. A combination as set forth in claim 8 in which the end surfaces of the main frame members abut and are at angles of 45° relative to the longitudinal axes of the main frame members; and in which at a juncture of two abutting ends of the main frame members, at least one fastener element extends through one of the two abutting ends transversely thereof and extends into the other of the two abutting ends longitudinally thereof.

11. A combination as set forth in claim 10 in which longitudinal portions of said auxiliary frame members overlie corresponding longitudinal portions of the main frame members and in which fastener elements extend through said longitudinal portions of the auxiliary frame members transversely thereof into the main frame members longitudinally thereof to interconnect the two frames.

12. A combination as set forth in claim 8 in which said main frame members are channel members with their open sides turned outwardly; and which includes means to support the sign structure, said support means extending through the web of one channel member at one edge of the main frame into the interior of the main frame, said support means being connected to the web of the opposite channel member.

13. A combination as set forth in claim 8 in which said main frame members are channel members with their open sides turned outwardly; in which the open sides of the channel members are spanned by removal cover plates; and in which the web of at least one of the channel members has an opening for access to the interior of the main frame.

14. A combination as set forth in claim 8 in which said main frame members are channel members with their open sides turned outwardly; in which the open sides of the channel members are spanned by removable cover plates; and which includes cooperative means on each cover plate and the corresponding channel member, respectively, for yielding engagement to releasably retain the cover plate on the chanel member.

References Cited

UNITED STATES PATENTS

| | | | |
|---|---|---|---|
| 2,769,263 | 11/1956 | Wamser | 40—132 |
| 2,970,397 | 2/1961 | Roseman | 40—156 |
| 2,979,842 | 4/1961 | De Ridder | 40—156 |
| 2,985,977 | 5/1961 | Roseman | 40—156 |
| 3,044,130 | 7/1962 | Mehaffy | 40—505 |
| 3,095,661 | 7/1963 | Ellis | 40—156 |
| 3,235,989 | 2/1966 | Brooks | 40—156 |

LAWRENCE CHARLES, *Primary Examiner.*

UNITED STATES PATENT OFFICE
CERTIFICATE OF CORRECTION

Patent No. 3,391,481                                July 9, 1968

Milton J. Lloyd

It is certified that error appears in the above identified patent and that said Letters Patent are hereby corrected as shown below:

Column 4, line 14, after "auxiliary" insert -- frame member --. Column 6, line 65, "elective" should read -- effective --. Column 8, line 73, "iutwardly" should read -- outwardly --.

Signed and sealed this 2nd day of December 1969.

(SEAL)
Attest:

Edward M. Fletcher, Jr.                      WILLIAM E. SCHUYLER, JR.
Attesting Officer                              Commissioner of Patents